United States Patent
Flore et al.

(10) Patent No.: US 7,995,534 B2
(45) Date of Patent: Aug. 9, 2011

(54) METHOD AND APPARATUS FOR SRNS RELOCATION IN WIRELESS COMMUNICATION SYSTEMS

(75) Inventors: Oronzo Flore, Ostuni (IT); Kalle I. Ahmavaara, San Diego, CA (US); Nathan Edward Tenny, Poway, CA (US); Rohit Kapoor, San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 878 days.

(21) Appl. No.: 11/936,735

(22) Filed: Nov. 7, 2007

(65) Prior Publication Data
US 2008/0181177 A1 Jul. 31, 2008

Related U.S. Application Data

(60) Provisional application No. 60/864,761, filed on Nov. 7, 2006.

(51) Int. Cl.
*H04W 4/00* (2009.01)
*H04W 36/00* (2009.01)
*H04W 72/00* (2009.01)

(52) U.S. Cl. ..... 370/331; 370/349; 370/350; 455/432.1; 455/436; 455/450; 455/509

(58) Field of Classification Search .................. 370/331, 370/349, 350; 455/432.1, 436, 450, 509
See application file for complete search history.

(56) References Cited

U.S. PATENT DOCUMENTS

| | | | | |
|---|---|---|---|---|
| 6,725,040 B2* | 4/2004 | Jiang | ............................. | 455/436 |
| 6,807,419 B1* | 10/2004 | Laiho et al. | .................... | 455/436 |
| 6,947,399 B1* | 9/2005 | Sen et al. | ....................... | 370/331 |
| 7,068,636 B2* | 6/2006 | Kuo | ............................. | 370/338 |
| 7,127,251 B2* | 10/2006 | Laiho et al. | .................... | 455/436 |
| 7,171,204 B2* | 1/2007 | Yuen | ............................. | 455/436 |
| 7,227,857 B2* | 6/2007 | Kuo | ............................. | 370/350 |
| 7,492,709 B2* | 2/2009 | Kirla | ............................. | 370/230 |
| 7,512,104 B2* | 3/2009 | Bjelland et al. | ............... | 370/338 |
| 7,643,450 B2* | 1/2010 | Marinescu et al. | ........... | 370/329 |
| 7,697,935 B2* | 4/2010 | Guyot et al. | .................. | 455/443 |
| 7,826,824 B2* | 11/2010 | Fischer et al. | ................ | 455/410 |

(Continued)

FOREIGN PATENT DOCUMENTS
RU        2263400        10/2005

(Continued)

OTHER PUBLICATIONS

3GPP TS 23.060 v. 7.4.0 (Mar. 2007) 3rd Generation Partnership Project; Technical Specification Group Services and System Aspects; General Packet Radio Service (GPRS); Service Description; Stage 2 (Release 7).

(Continued)

*Primary Examiner* — Alpus H Hsu
(74) *Attorney, Agent, or Firm* — D. Scott Juneau

(57) ABSTRACT

A method for SRNS relocation comprises sending a relocation request from a Source Node B+ to a Target Node B+ based on measurements received from a User Equipment; sending a Physical Channel reconfiguration message from the Source Node B+ to the UE; forwarding Packet Data Units (PDU) from the source Node B+ to the Target Node B+; and performing physical layer synchronization and radio link establishment with a target cell of the Target Node B+.

8 Claims, 4 Drawing Sheets

U.S. PATENT DOCUMENTS

| | | | |
|---|---|---|---|
| 2003/0210676 A1* | 11/2003 | Wu | 370/350 |
| 2003/0210714 A1* | 11/2003 | Wu | 370/503 |
| 2004/0151154 A1* | 8/2004 | Wu | 370/349 |
| 2005/0197124 A1 | 9/2005 | Kang et al. | |
| 2006/0140159 A1* | 6/2006 | Choi et al. | 370/336 |
| 2007/0213060 A1* | 9/2007 | Shaheen | 455/436 |
| 2007/0254667 A1* | 11/2007 | Jokinen | 455/436 |
| 2008/0037548 A1* | 2/2008 | Yi et al. | 370/394 |
| 2008/0095175 A1* | 4/2008 | Grandhi et al. | 370/395.52 |
| 2008/0098467 A1* | 4/2008 | Miller et al. | 726/5 |

FOREIGN PATENT DOCUMENTS

| | | |
|---|---|---|
| RU | 2267224 | 12/2005 |
| RU | 2006106706 | 9/2006 |

OTHER PUBLICATIONS

3GPP TSG RAN: "3rd Generation Partnership Project; Technical Specification Group Radio Access Network; HSPA Evolution beyond Release 7 (FDD); (Release 7)" 3GPP TR 25.999 vo. 3.1 Internet Citation, [Online] Oct. 18, 2006, XP002475151, URL:http://www.3gpp.org/f.

3GPP: "3rd Generation Partnership Project: Technical Specification Group Radio Access Network; HSPA Evolution (FDD); (Release 7)" Internet Citation, [Online] May 2007, XP002450091 Retrieved from the internet: URL:http://www.3gpp.org/ftp/Specs/archive/25_s.

R3-061478 "On UPE relocation", Qualcomm Europe, Oct. 9-13, 2006.

Samsung: "Relocation of AGW for LTE_ACTIVE UE's" Internet Citation, [Online] Apr. 3, 2006, XP002453513 Retrieved from the Internet: URL:http://www.3gpp.org/ftp/tsg_ran/WG3_1u/TSGR3_51bis/docs/R3-060439.zip> [retrieved on Oct. 1, 2007].

International Search Report—PCT/US2007/084000, International Search Authority—European Patent Office—Apr. 29, 2008.

Written Opinion—PCT/US2007/084000, International Search Authority—European Patent Office—Apr. 29, 2008.

3GPP TSG-RAN WG2 Meeting #54, LTE Handover preparation, R2-062235, Huawei, Tallin, Estonia, Sep. 1, 2006, p. 3-4.

3rd Generation Partnership Project, Evolved Universal Terrestrial Radio Access (E-UTRA) and Evolved Universal Terrestrial Radio Access Network (E-UTRAN); Radio interface protocol aspects, Release 7, 3GPP TR 25.813 Technical Report, vol. 25.813, No. v101, Jun. 2006.

\* cited by examiner

METHOD AND APPARATUS FOR SRNS RELOCATION IN WIRELESS COMMUNICATION SYSTEMS

CROSS-REFERENCE TO RELATED APPLICATION

This application claims the benefit of U.S. Provisional Application Ser. No. 60/864,761, filed on Nov. 7, 2006, and entitled "ENHANCED SRNS RELOCATION FOR THE HSPA EVOLUTION." The entirety of this application is incorporated herein by reference.

BACKGROUND

I. Field

The present invention relates generally to wireless communications and more specifically to Serving Radio Network Subsystem (SRNS) relocation procedures in wireless communication systems.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

High-Speed Packet Access (HSPA) Evolution, also called Evolved HSPA or HSPA+ is currently discussed within the $3^{rd}$ Generation Partnership Project (3GPP) as a transition between current HSPA systems and Long Term Evolution (LTE) systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method for SRNS relocation comprises sending a relocation request from a Source Node B+ to a Target Node B+ based on measurements received from a User Equipment; sending a Physical Channel reconfiguration message from the Source Node B+ to the UE; forwarding Packet Data Units (PDU) from the source Node B+ to the Target Node B+; and performing physical layer synchronization and radio link establishment with a target cell of the Target Node B+.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
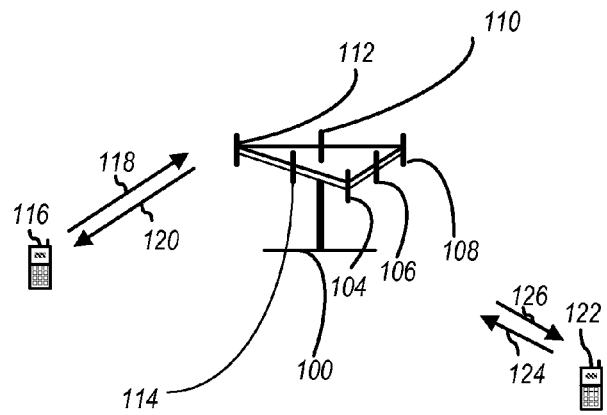
FIG. 1 illustrates a multiple access wireless communication system according to one embodiment.

Various embodiments are now described with reference to the drawings, wherein like reference numerals are used to refer to like elements throughout. In the following description, for purposes of explanation, numerous specific details are set forth in order to provide a thorough understanding of one or more embodiments. However, it may be evident that such embodiment(s) may be practiced without these specific details. In other instances, well-known structures and devices are shown in block diagram form in order to facilitate the description of one or more embodiments.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. A access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
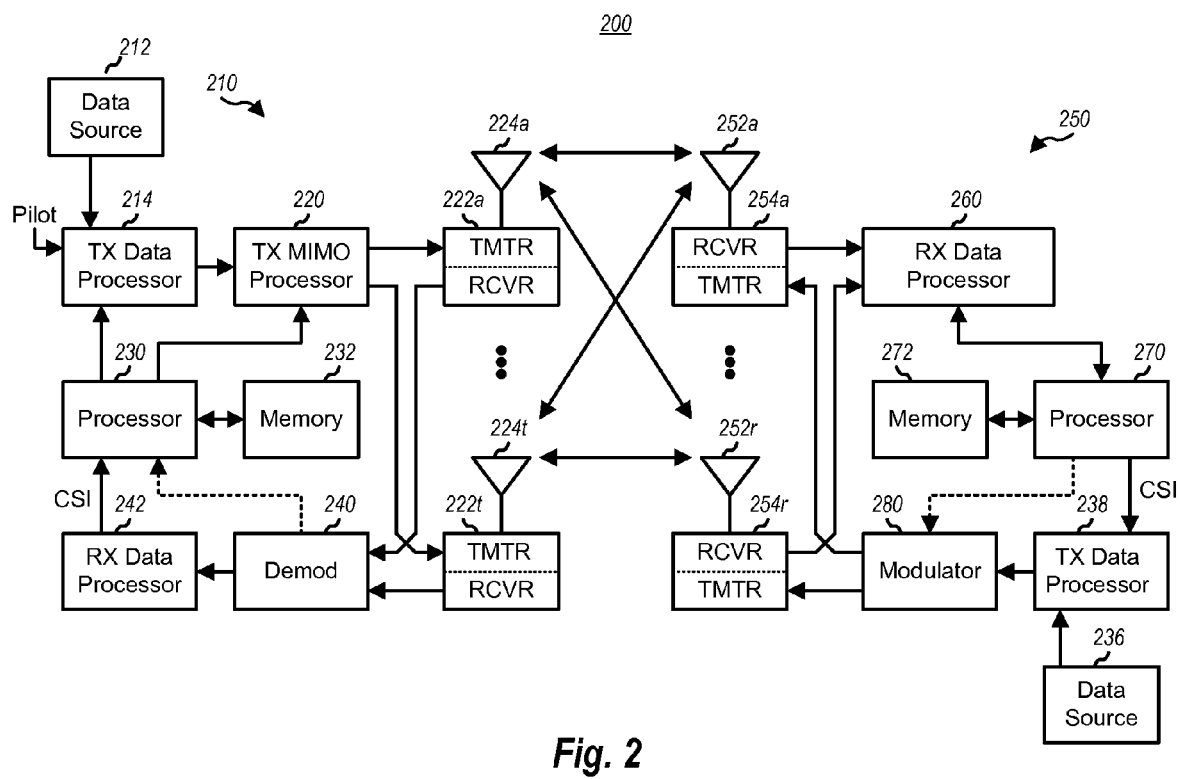
FIG. 2 illustrates an exemplary a block diagram of a communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and pluarlity of PHY channels. The PHY channels comprises a set of DL channels and UL channels.

Different network architecture options are currently being investigated in the context of HSPA Evolution. In one of the options, it is proposed to collapse all Radio Network Controller (RNC) functions down in an "evolved" Base Station hereinafetr denoted Node B+.

In such a solution, the SRNS relocation procedure will be extensively used to handle the inter-Node B+ mobility. The current procedure is not efficient to handle this kind of mobility.

This specification discloses an enhanced SRNS relocation procedure, which is more in line with the way inter-eNode B mobility is handled in LTE. The proposed scheme can also be seen as an optimized intra-SGSN SRNS relocation procedure. The proposed enhanced mobility scheme achieves reduced handover delay and reduced processing load at the Core Network (CN). It requires less signaling messages and mainly relies on the Node B+ to Node B+ communication.

C-Plane Handling

Figure 3:
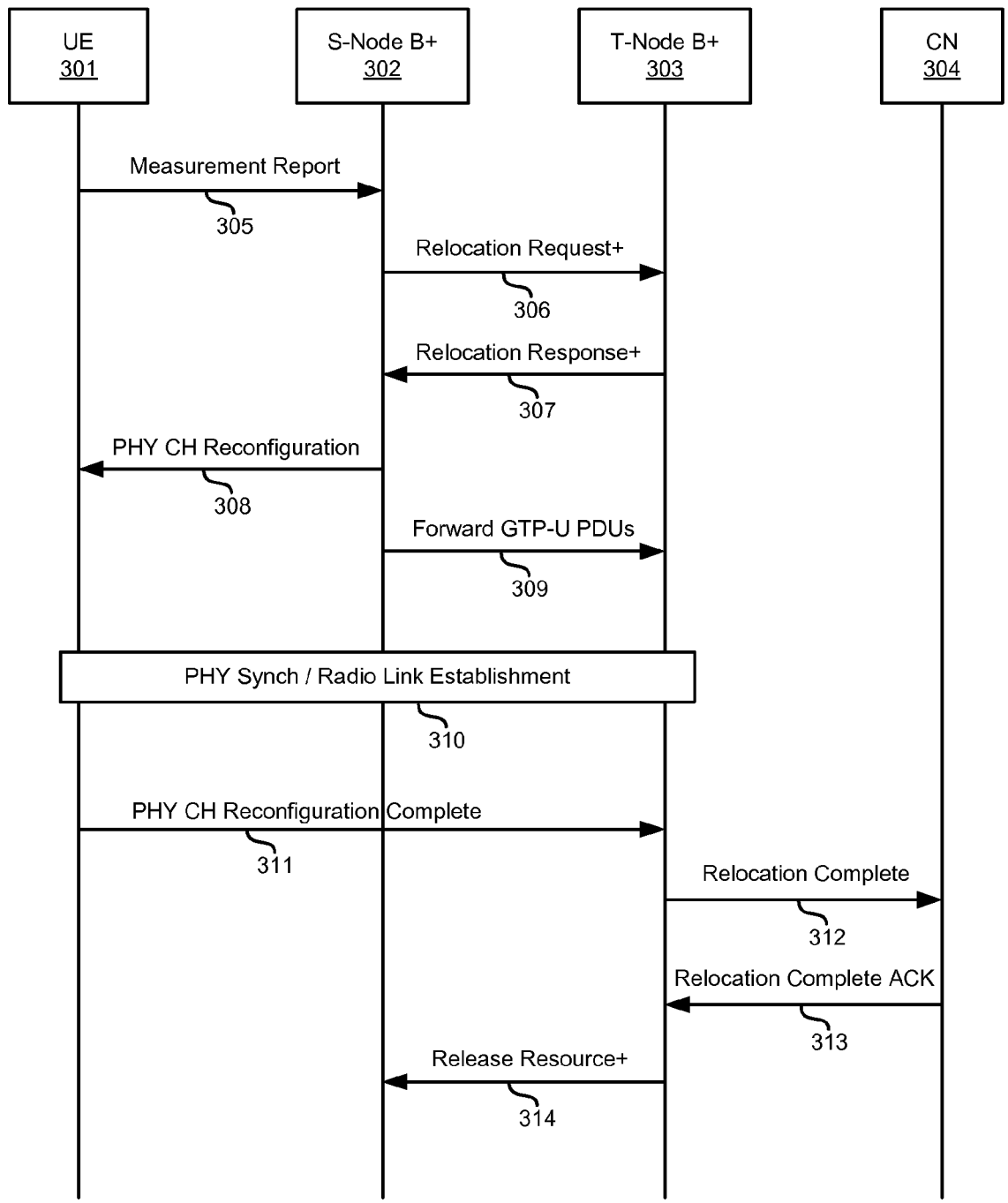
FIG. 3 illustrates an exemplary embodiment of signaling flow for enhanced SRNS relocation with hard handover.

With reference now to FIG. 3, there is depicted a signaling flow for the enhanced SRNS relocation procedure with hard handover. In particular the following steps apply:

1) Based on measurement reports 305 from the UE 301 (and possibly some other RRM specific information), the source Node B+ 302 decides to handover the UE 301 to a cell controlled by the target Node B+ 303.

2) The source Node B+ 302 issues a Relocation Request 306 to the target Node B+ 303 passing the necessary information (context transfer) to prepare the HO at the target side. After performing Admission Control, the target Node B+ 303 configures the required resources.

3) A Relocation Response message 307 is sent to the source Node B+ 302 with the necessary information for the UE 301 to reconfigure the radio path towards the target Node B+ 303.

4) A PHYSICAL CHANNEL RECONFIGURATION message 308 is sent by the source Node B+ 302 with the information to access the cell in the target Node B+ 303.

A) The source Node B+ 302 can start forwarding GTP Packet Data Units (PDU) 309 of the different Radio Access Bearers (RAB) to the target Node B+ 303, depending on their QoS Profile (including means for minimizing/avoiding packet loss).

5) Physical layer synchronization and radio link establishment 310 are performed with the target cell in the target Node B+ 303.

6) The UE 301 sends a PHYSICAL CHANNEL RECONFIGURATION COMPLETE message 311 to the target cell of target Node B+ 303.

7) The target Node B+ 303 sends a Relocation Complete message 312 to the Core Network (CN) 304 with a request to establish the different RABs between target Node B+ 303 and CN 304.

8) The CN 304 responds with a Relocation Complete Acknowledge message 313 and starts to forward the data in the new path.

9) The target Node B+ 303 finally initiates the release of the resources in the source Node B+ 302.

Figure 4:
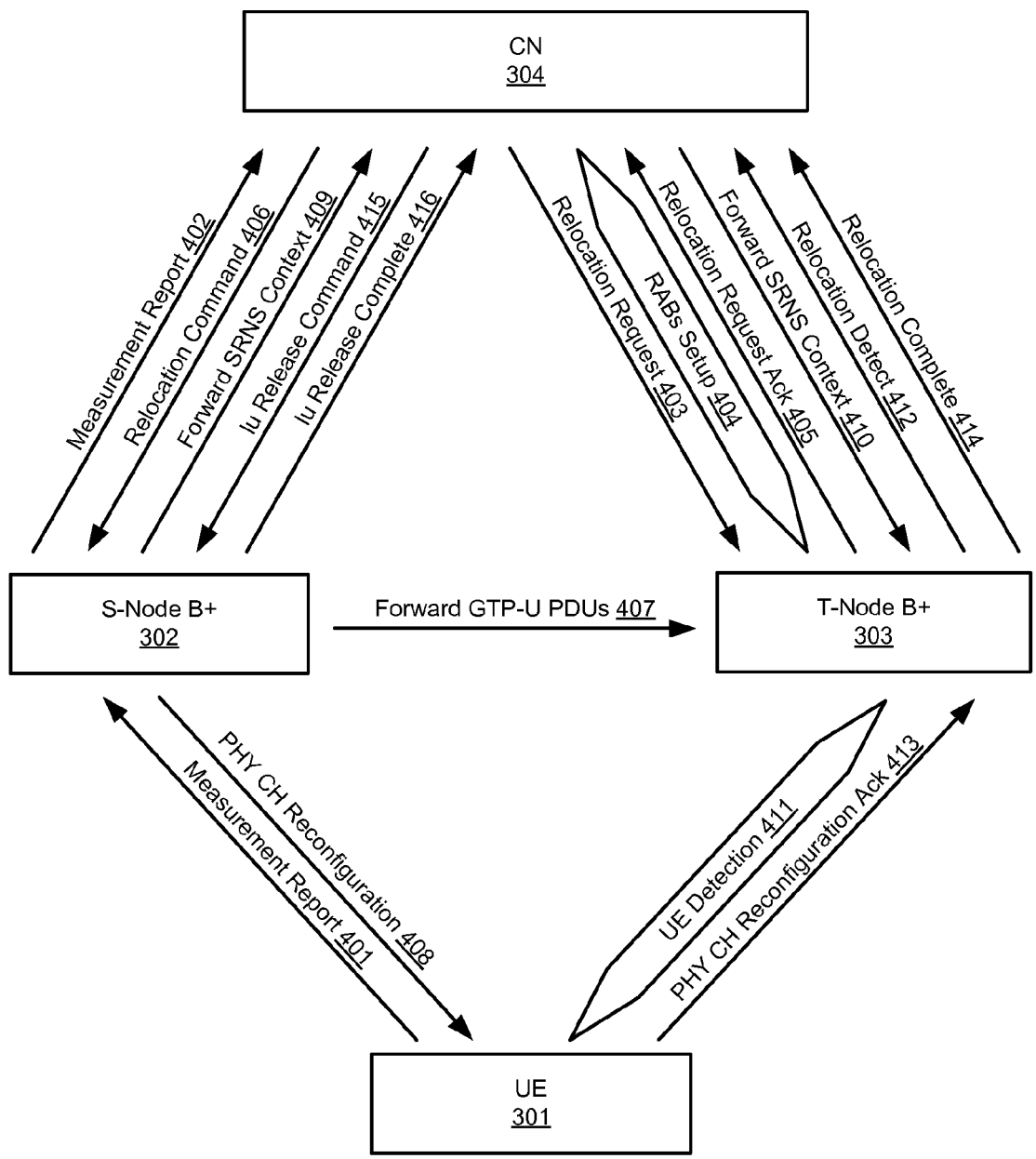
FIG. 4 illustrates an exemplary embodiment of a current SRNS relocation procedure.
Figure 5:
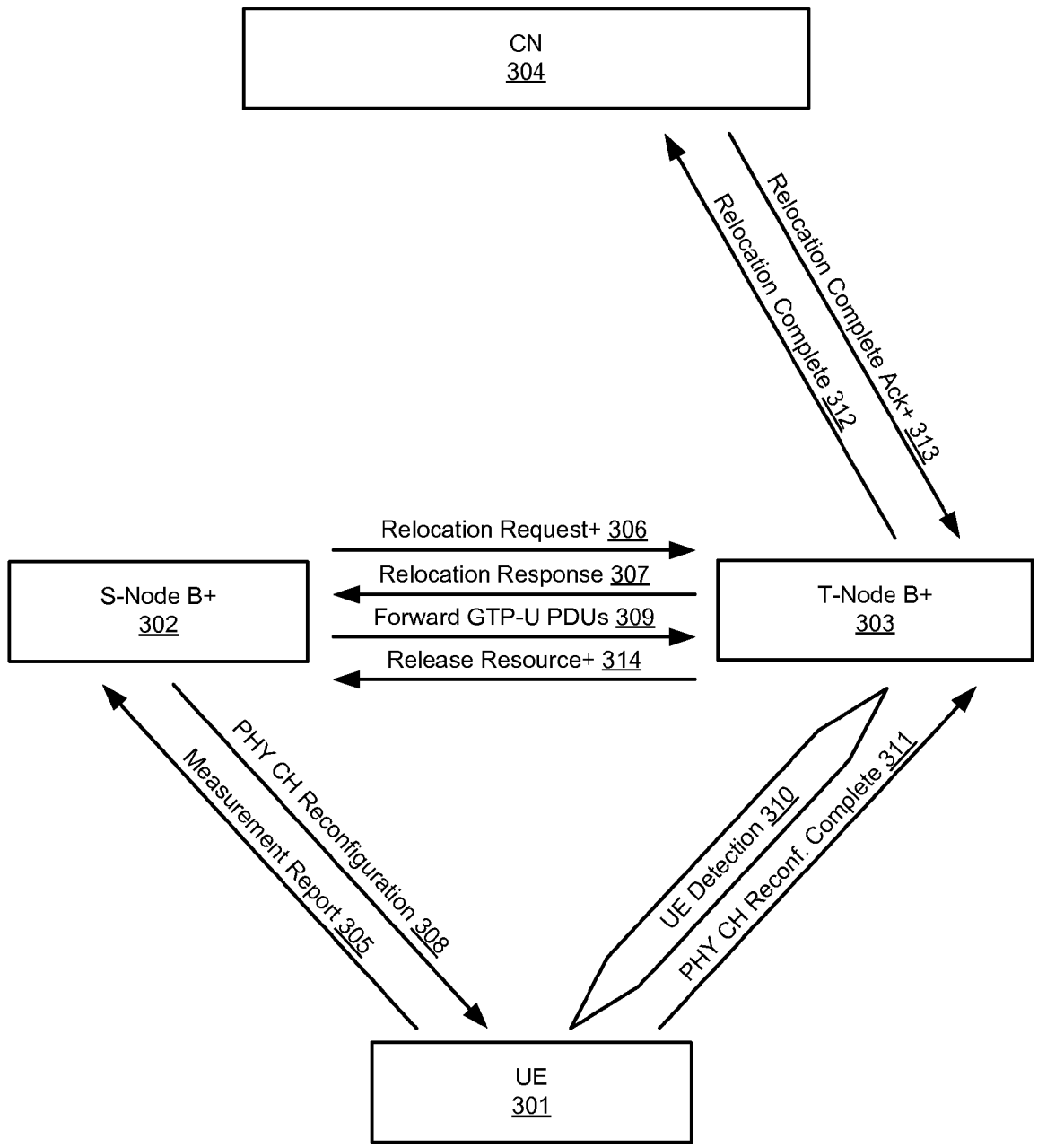
FIG. 5 illustrates an exemplary embodiment of an enhanced SRNS relocation with hard handover.

With reference now to FIG. 4 and FIG. 5, the enhanced procedure (FIG. 5) can be compared to the current SRNS relocation (FIG. 4) with hard handover. Referring to these figures, it can be seen that the enhanced procedure achieves: reduced handover delay; reduced processing load at the CN; and does not require any change over the air, and therefore is backward compatible with respect to legacy UEs.

For example, as shown in FIG. 4, the current SRNS relocation may include the following flow of messages between the UE 301, source Node B+ 302, target Node B+ 303, and CN 304: Measurement Report 401, Relocation Required message 402, Relocation Request 403, RABs Setup 404, Relocation Request Ack 405, Relocation Command 406, Forward GTP-U PDUs 407, PHY CH Reconfiguration message 408, Forward SRNS Context 409, Forward SRNS Context 410, UE detection 411, Relocation Detect message 412, PHY CH Reconfiguration Ack 413, Relocation Complete message 414, Iu Release Command 415, and Iu Release Complete message 416.

The enhanced SRNS relocation procedure of FIG. 5, on the other hand, may include a more streamlined message flow that is more efficient and that minimizes/avoids packet loss. The flow of messages between the UE 301, source Node B+ 302, target Node B+ 303, and CN 304 in FIG. 5 is the same as in FIG. 3 and its description will thus be omitted.

U-Plane Handling

User plane handling in the current SRNS relocation procedure is based on the relocation of RoHC. In our enhanced mobility scheme, user plane handling is based instead on a "Fresh Start" approach. In this approach:

After receiving the Relocation Response message, the source Node B+ starts to buffer a copy of the incoming GTP-U PDUs before transmitting them to its header compression entity.

After sending the CHANNEL RECONFIGURATION message, the source Node B+ forwards all buffered GTP-U PDUs, whose transmission has not been acknowledged, to the target Node B+.

Header compression is re-started at the target Node B+

Because the current RoHC protocol does not gracefully handle packets out-of-order, a reordering mechanism is needed at the target Node B+ before starting compressing the GTP-U PDUs that are arriving from both source Node B+ and CN. One simple mechanism could be as follows:

After receiving the PHYSICAL CHANNEL RECONFIGURATION COMPLETE message, the target Node B+ can start compressing/transmitting all the GTP-U PDUs already received by the source Node B+.

After receiving the Relocation Complete Ack. message, the target Node B+ can hold the GTP-PDUs arriving from the new route (i.e. directly from the CN) for a certain amount of time in case GTP-PDUs still arrive from the old route (i.e. forwarded by the source Node B+)

If RoHC v2 is used, then packets arriving out of orders are not an issue and therefore the target Node B+ can start compressing and transmitting GTP-U PDUs packets as soon as it receives the PHYSICAL CHANNEL RECONFIGURATION COMPLETE message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for performing a Serving Radio Network Subsystem (SRNS) relocation in communication networks, comprising:
   sending a relocation request from a source node-to a target node-based on measurements received from an access terminal;
   receiving Packet Data Units (PDUs) at the source node from the access terminal;
   buffering copies of the PDUs in a buffer of the source node prior to transmitting the PDUs to a header compression entity;
   sending a Physical Channel reconfiguration message from the source node-to the access terminal;
   forwarding the PDUs from the source node to the target node; and
   performing physical layer synchronization and radio link establishment with a target cell of the target node.

2. The method of claim 1, wherein, after the target node receives a relocation complete acknowledgment message from a network, the target node holds any PDUs arriving from the network for a period of time to receive any additional PDUs from the source node, and reorders the PDUs received from the network and the PDUs received from the source terminal.

3. An apparatus comprising:
   means for sending a relocation request from a source node-to a target node based on measurements received from an access terminal;
   means for receiving Packet Data Units (PDUs) at the source node from the access terminal;
   means for buffering copies of the PDUs in a buffer of the source node prior to transmitting the PDUs to a header compression entity;
   means for sending a Physical Channel reconfiguration message from the source node-to the access terminal;
   means for forwarding the PDUs from the source node-to the target node; and
   means for performing physical layer synchronization and radio link establishment with a target cell of the target node.

4. The apparatus of claim 3, wherein, after the target node receives a relocation complete acknowledgment message from a network, the target node holds any PDUs arriving from the network for a period of time to receive any additional PDUs from the source node, and reorders the PDUs received from the network and the PDUs received from the source terminal.

5. A method for performing a Serving Radio Network Subsystem (SRNS) relocation in communication networks, comprising:
   receiving a relocation request at a target node from a source node based on measurements received from an access terminal;
   transmitting a relocation response from the target node to the source node;
   receiving Packet Data Units (PDUs) at the target node from the source node, wherein copies of the PDUs are buffered in a buffer of the source node prior to transmission of the PDUs to a header compression entity;
   establishing a radio link between the target node and the access terminal;
   receiving a reconfiguration complete message at the target node from the access terminal indicating that a physical channel reconfiguration of the access terminal is complete;

transmitting a relocation complete message from the target node to a network;

receiving a relocation complete acknowledgment message at the target node from the network; and initiating a release of resources at the source node by the target node.

6. The method of claim 5, further comprising:

holding any PDUs arriving from the network for a period of time to receive any additional PDUs from the source node after receiving the relocation complete acknowledgment message; and reordering the PDUs received from the network and the PDUs received from the source terminal.

7. An apparatus, comprising:

means for receiving a relocation request at a target node from a source node based on measurements received from an access terminal;

means for transmitting a relocation response from the target node to the source node;

means for receiving Packet Data Units (PDUs) at the target node from the source node, wherein copies of the PDUs are buffered in a buffer of the source node prior to transmission of the PDUs to a header compression entity;

means for establishing a radio link between the target node and the access terminal;

means for receiving a reconfiguration complete message at the target node from the access terminal indicating that a physical channel reconfiguration of the access terminal is complete;

means for transmitting a relocation complete message from the target node to a network;

means for receiving a relocation complete acknowledgment message at the target node from the network; and means for initiating a release of resources at the source node by the target node.

8. The apparatus of claim 7, further comprising:

means for holding any PDUs arriving from the network for a period of time to receive any additional PDUs from the source node after receiving the relocation complete acknowledgment message; and means for reordering the PDUs received from the network and the PDUs received from the source terminal.

* * * * *